United States Patent
Picard et al.

(10) Patent No.: US 10,057,959 B2
(45) Date of Patent: Aug. 21, 2018

(54) POWER OVER ETHERNET POWERED DEVICE HAVING AUTOMATIC POWER SIGNATURE

(71) Applicant: Texas Instruments Incorporated, Dallas, TX (US)

(72) Inventors: Jean Picard, Hooksett, NH (US); David N. Abramson, Hooksett, NH (US); Karl H. Jacobs, Hampton, NH (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 31 days.

(21) Appl. No.: 14/867,635

(22) Filed: Sep. 28, 2015

(65) Prior Publication Data

US 2016/0095175 A1 Mar. 31, 2016

Related U.S. Application Data

(60) Provisional application No. 62/057,028, filed on Sep. 29, 2014.

(51) Int. Cl.
*H05B 37/02* (2006.01)
*H05B 33/08* (2006.01)
*H04L 12/10* (2006.01)

(52) U.S. Cl.
CPC ............ *H05B 33/089* (2013.01); *H04L 12/10* (2013.01); *H05B 33/0815* (2013.01)

(58) Field of Classification Search
CPC ............ H05B 33/0815; H05B 33/0851; H05B 33/089

USPC .......................................................... 315/294
See application file for complete search history.

(56) References Cited

U.S. PATENT DOCUMENTS

| | | | |
|---|---|---|---|
| 2004/0251854 A1* | 12/2004 | Matsuda ............ | H05B 33/0815 315/291 |
| 2007/0237322 A1 | 10/2007 | Hussain et al. | |
| 2009/0206776 A1* | 8/2009 | Inaba ................. | H05B 33/0815 315/307 |
| 2012/0060042 A1 | 3/2012 | Buhari et al. | |
| 2012/0102341 A1 | 4/2012 | Hussain et al. | |
| 2012/0104860 A1* | 5/2012 | Feng ......................... | H02J 1/10 307/80 |
| 2012/0280617 A1* | 11/2012 | Josefowicz ........ | H05B 33/0815 315/85 |
| 2013/0073874 A1 | 3/2013 | Eghbal | |

(Continued)

FOREIGN PATENT DOCUMENTS

EP 2701338 A1 2/2014

OTHER PUBLICATIONS

Guo, et al. "TP523752 Maintain Power Signature Operation in Sleep Mode," Texas Instruments Incorporated, Application Report, WLVA588—Apr. 2013, pp. 1-13.

(Continued)

*Primary Examiner* — Tung X Le
(74) *Attorney, Agent, or Firm* — Tuenlap D. Chan; Charles A. Brill; Frank D. Cimino

(57) ABSTRACT

In a Power over Ethernet (PoE) system, a Powered Device (PD) having circuitry to measure the load current from a Power Sourcing Equipment (PSE) in the PD. Circuitry compares the measured load current with a first threshold. Circuitry automatically generates load pulses for signaling the PSE, that power to the PD should be maintained.

8 Claims, 4 Drawing Sheets

(56) References Cited

U.S. PATENT DOCUMENTS

| | | | |
|---|---|---|---|
| 2013/0154603 A1 | 6/2013 | Cerutti et al. | |
| 2014/0340615 A1* | 11/2014 | Kikuchi | H05B 33/0815 349/61 |
| 2015/0194881 A1* | 7/2015 | Wendt | H05B 33/0848 323/312 |
| 2015/0303687 A1* | 10/2015 | Yseboodt | H02J 1/00 307/31 |
| 2015/0365003 A1* | 12/2015 | Sadwick | H02M 3/28 363/21.01 |

OTHER PUBLICATIONS

Search Report for PCT Application No. PCT PCT/US15/53053, dated Dec. 29, 2015 (1 page).
Extended European Search Report; dated May 28, 2018. 9 pages.

* cited by examiner

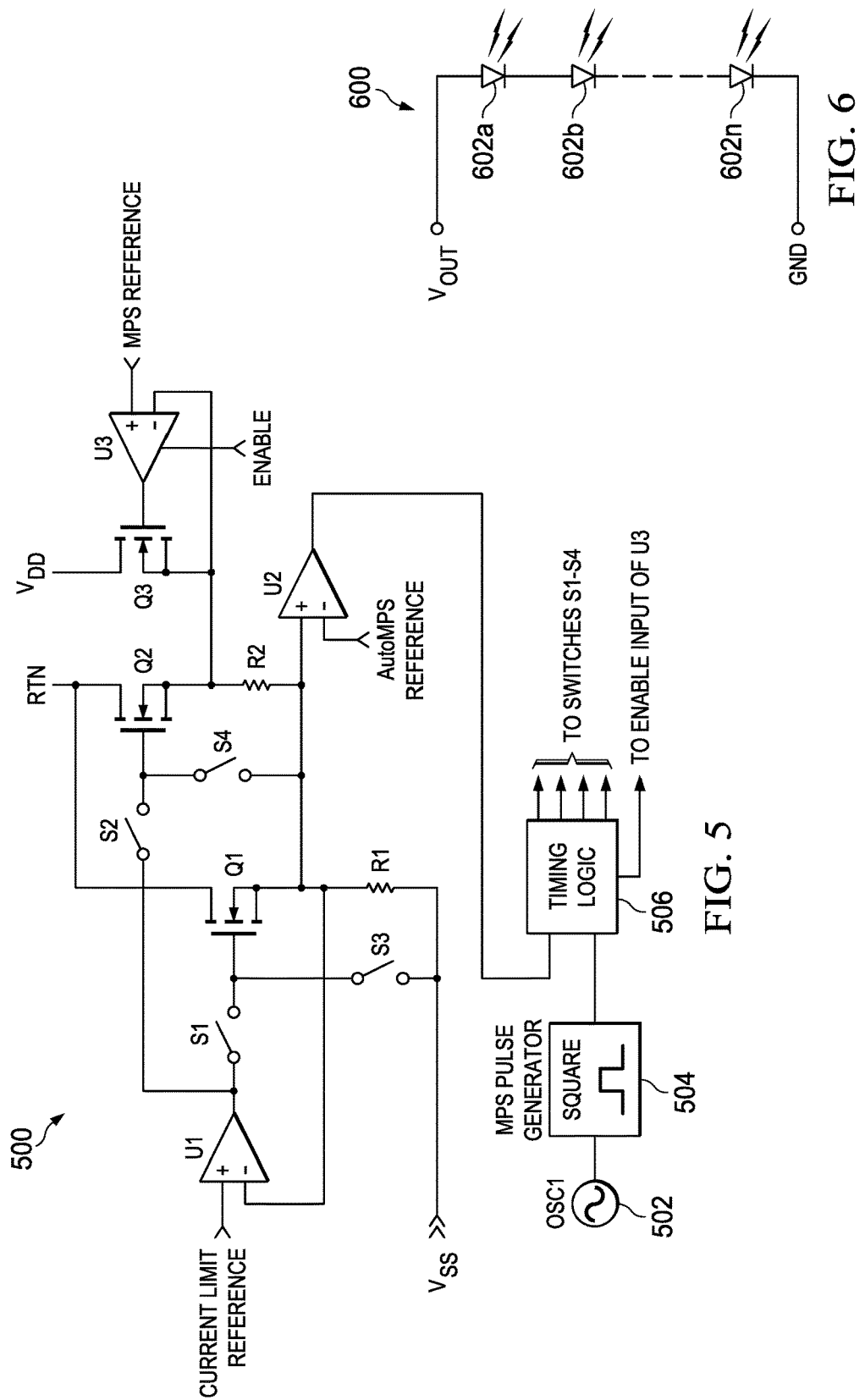

POWER OVER ETHERNET POWERED DEVICE HAVING AUTOMATIC POWER SIGNATURE

CROSS-REFERENCE TO RELATED APPLICATIONS

This application claims the benefit of U.S. Provisional Patent Application No. 62/057,028, filed Sep. 29, 2014, which is incorporated herein by reference in its entirety and for all purposes.

FIELD

This disclosure relates to Power over Ethernet (PoE) and, more specifically, to Maintaining Power Signature (MPS) operation in sleep mode.

BACKGROUND

Power over Ethernet is a system which allows electrical power to be passed down Ethernet cabling along with data. This permits a single Ethernet cable, such as category 5 or category 6 cabling, to provide both a data connection and electrical power to devices; such as wireless access points, IP cameras, and IP telephones, without the need to run separate power and data cabling. This can save considerable cost when installing a new system or when changes need to be made to an existing system, because it eliminates the need for an electrician to install a local AC power point when the system is installed or move the AC power point, when a device on the network is moved and is no longer close to a power outlet.

These systems are often subject to IEEE standards, such as IEEE standard 802.3 or the current version, IEEE Std 802.3-2012. The higher power amounts available in newer systems has led to their being utilized for backup power supplies, which must always be functional, and LED lighting systems, where some vital functionality must be maintained even though the light is simply turned off. The IEEE standard requires that the power to the PD from the PSE be removed if the current consumption falls below a predetermined limit, such as 5 mA or 10 mA. In order to maintain power to the PD, the PD may provide a maintain power signature (MPS) which is an electrical signature assuring the PSE that the PD still requires power. A valid MPS consists of a minimum DC current, such as 10 mA or a 10 mA pulse at least 75 ms in duration delivered at least once every 325 ms, and an AC impedance lower than 26.3 KΩ in parallel with 0.05 μF. In addition, the new IEEE standard 802.3bt will most likely use the same technique but with different current level and timing values. In addition, 802.3bt will likely also remove the AC impedance requirements.

Current systems either maintain the power drawn by the PD above the minimum or require an activation signal from an external source in order to provide current pulses to meet the MPS requirements.

Accordingly, there is a need for a circuit within the PD that automatically determines the need for MPS signal, without the need for an externally generated signal, and which provides the MPS pulses in order to maintain power to the PD while minimizing the power consumed.

SUMMARY

An aspect constructed according to the principles of the present disclosure includes a Power over Ethernet (PoE) system including a Powered Device (PD) having a PD interface circuit which includes circuitry to measure load current from a Power Sourcing Equipment (PSE) in the PD. Circuitry compares measured load current with a first threshold. Circuitry responsive to the circuitry to compare automatically generates load pulses for signaling the PSE that power to the PD should be maintained.

An aspect constructed according to the principles of the present disclosure includes an interface circuit for a Powered Device (PD) that can be coupled to a Power Sourcing Equipment (PSE) in a Power over Ethernet (PoE) system having a comparator coupled to a first resistor through which current flows from the PSE when connected to a load within the PD, the comparator measuring a voltage drop across the first resistor to determine the load current and generate an output signal representative of the load current. A timing logic responsive to the output signal generates switch control signals and an enable signal. A switch responsive to one of switch control signals inserts a second resistor in a current path of the first resistor for generating a more accurate current pulse in order to meet MPS requirements. An error amplifier coupled to the current path and responsive to the enable signal automatically generates a load pulse of sufficient magnitude that, along with load current drawn by the PD, signals the PSE that power to the PD should be maintained.

An aspect constructed according to the principles of the present disclosure includes a Powered Device (PD) for Power over Ethernet (PoE) systems having a comparator measuring load current in the PD and comparing the load current to a reference and generating an output signal. A timing logic circuit responsive to the output signal generates an enable signal. An error amplifier responsive to the enable signal generates an output voltage based on a reference. A resistor coupled to an output of the error amplifier draws a current pulse when coupled to a Power Sourcing Equipment (PSE) to automatically signal the PSE that power to the PD should be maintained.

An aspect constructed according to the principles of the present disclosure includes a method for operating a Power over Ethernet (PoE) Powered Device (PD) having an LED general lighting load detecting a load current below a predetermined limit. Automatically generating Maintain Power Signature (MPS) pulses to signal a Power Sourcing Device (PSE) supplying power to the PD, that power to the PD should be maintained.

BRIEF DESCRIPTION OF DRAWINGS

Further aspects of the invention will appear from the appending claims and from the following detailed description given with reference to the appended drawings.

FIG. 5 is a schematic diagram of a second embodiment in accordance with the present disclosure;

FIG. 6 shows an LED load for the PD.

DETAILED DESCRIPTION

Figure 1:
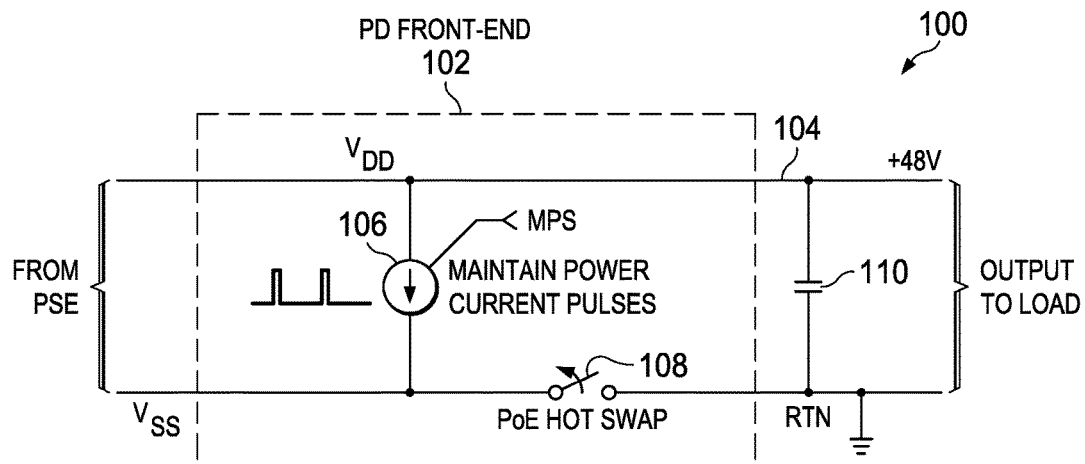
FIG. 1 is a diagram of a system of the prior art.

FIG. 1 shows a system, according to the prior art, generally as 100. Power flows from the PSE through the PD front end 102 to the PD system 104 and capacitor 110 which is part of a load (not shown). Power flowing to the load is controlled by PoE hot-swap switch 108. If the load current is less than required, to maintain power to the PD from the PSE, an external circuit (not shown) generates a MPS signal supplied to the circuit 106 to cause the circuit 106 to generate maintain power current pulses on the input line from the PSE. The externally generated pulse may be generated by a microprocessor located in a separate integrated circuit from the PD interface circuit (PD front-end circuit 102), thus requiring an additional integrated circuit. This not only increases the cost to the end-user, it increases the complexity as well, as the end-user must now provide a circuit that measures the power consumption, generates the MPS signal, and does so in a way which minimizes the power consumed by the measuring device, such as a resistive shunt. It is also known to receive a signal from the application circuit when the user presses a button that puts an IP phone to sleep. The MPS pulses are generated until it receives a wake signal that, again, is generated from the user pressing a button.

Figure 2:
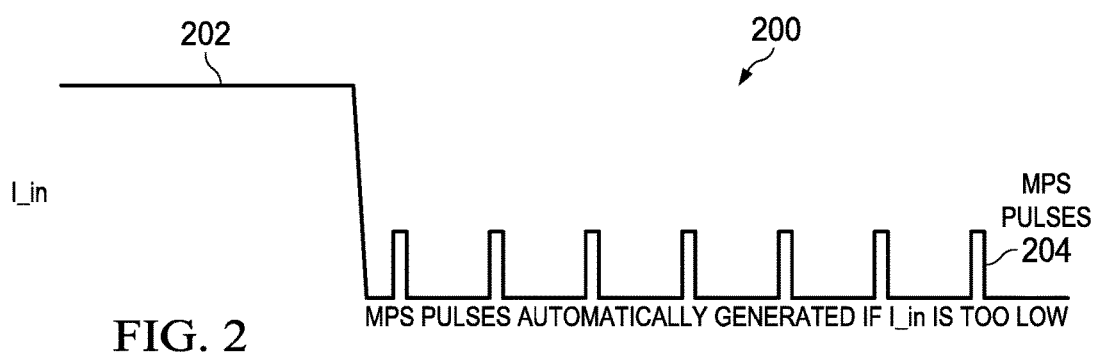
FIG. 2 is a diagram of MPS pulses automatically generated if I_in is too low.

FIG. 2 shows the waveform for the input current to the PD, generally as 200. In FIG. 2, when the current I_in 202 drops below the value required to maintain power to the PD, MPS pulses of a magnitude, duration and pulse frequency are automatically generated in accordance with aspects of the present application, as shown at 204.

Figure 3:
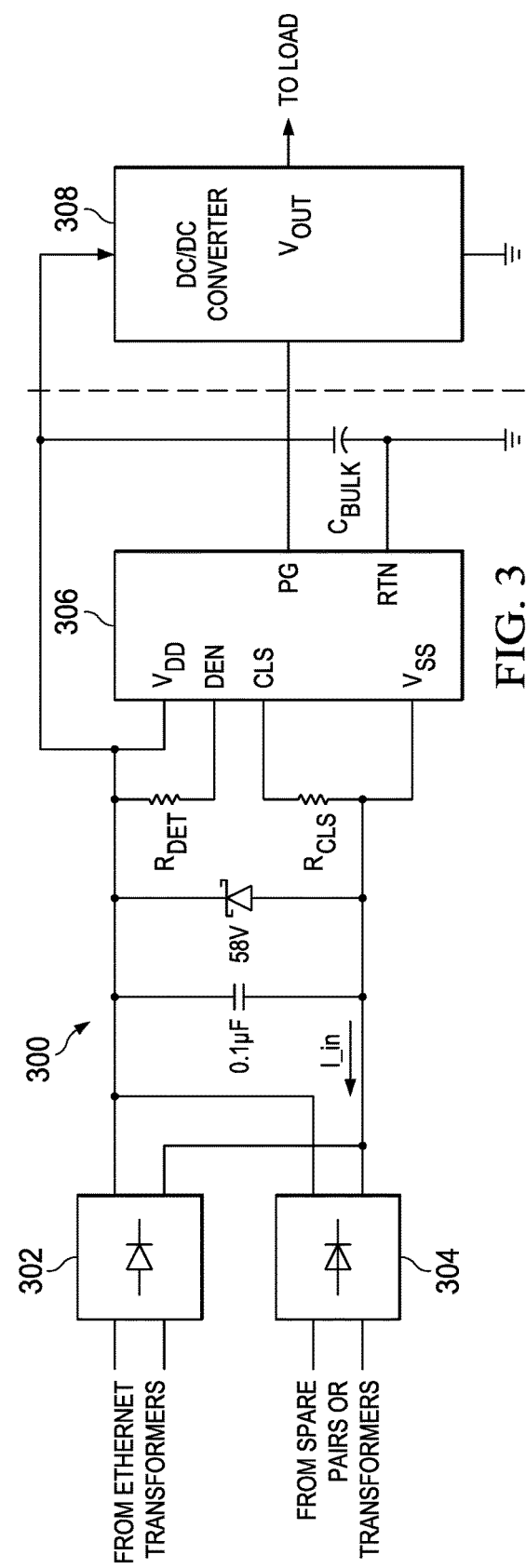
FIG. 3 is a schematic block diagram of a system in accordance with the present disclosure.

FIG. 3 is a schematic block diagram of a system within a PD, shown generally as 300. In FIG. 3, block 306 contains the circuitry which is shown in greater detail in FIGS. 4 and 5. The PD receives power from the PSE along two or four pairs of the four pairs of wires within the Ethernet cable, here labeled 302 and 304. A capacitor and a Zener diode protects against voltage spikes. At startup, the PSE looks for the resistor Rdet which is utilized to determine if a valid resistance, defined by the IEEE standard, is detected which indicates that the PD is requesting power from the PSE. The PSE then increases voltage and determines the amount of current drawn through the resistor Rcls which determines how much power is to be provided as defined by the IEEE standard. Once the input voltage has been increased to the operating voltage, the DC to DC converter 308 is turned on by pulling RTN to Vss in a controlled manner in order to control inrush current, as with all hot-swap devices. Then, the current is allowed up to its full current limit. A "power good" signal is provided at the terminal PG. The DC/DC converter 308, shown in FIG. 3, may not be part of the PD interface circuit, but is utilized to provide a controlled voltage to a load. This load may be LED lighting, for example. The capacitor Cbulk is utilized by the DC to DC converter during startup and to keep the voltage $V_{DD}$ input to the converter stable.

Figure 4:
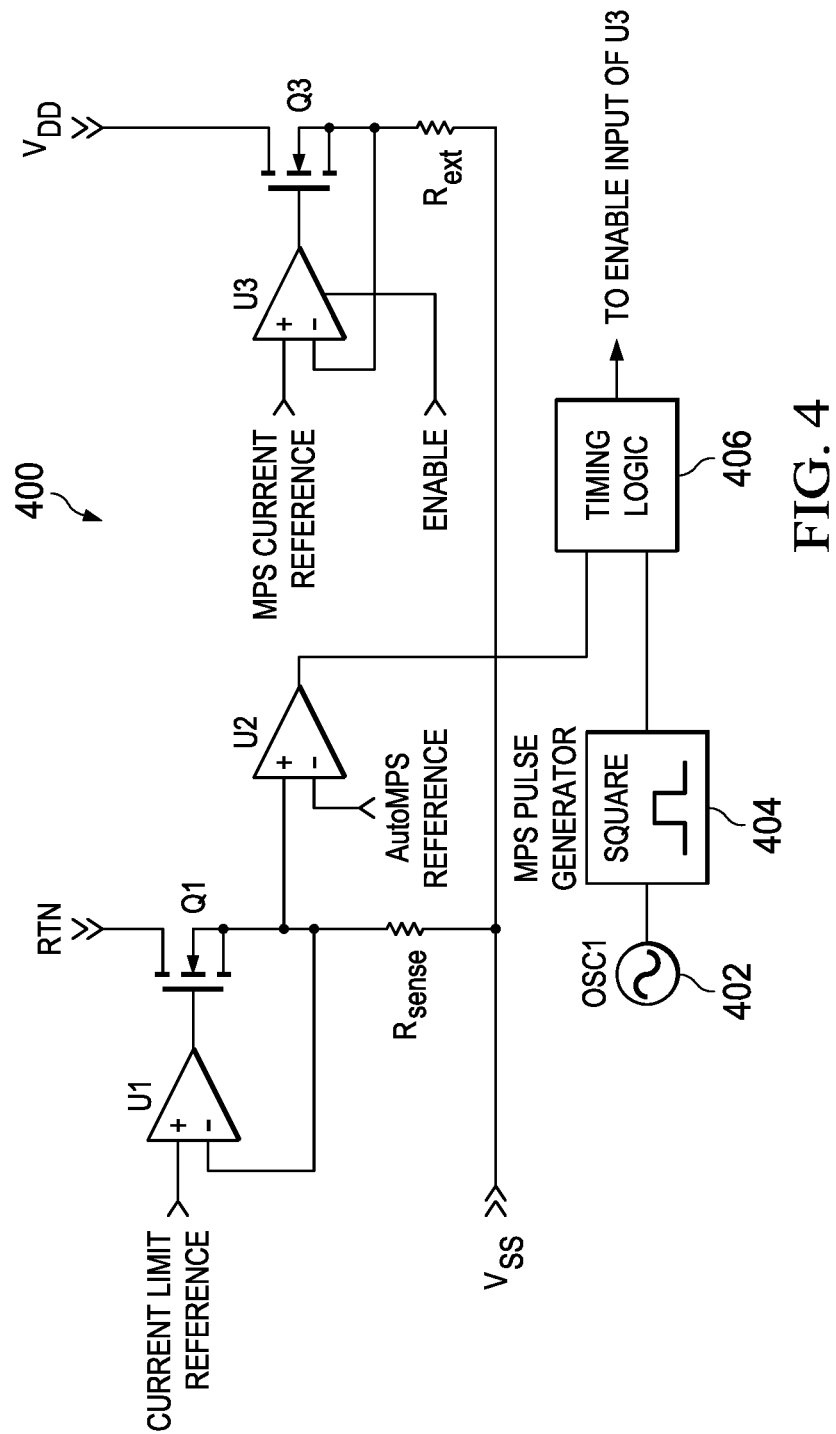
FIG. 4 is a schematic diagram of a first embodiment in accordance with the present disclosure.

FIG. 4 shows an embodiment of the circuit, shown in FIG. 3 as 306, generally as 400, although the circuit 306 may have other functions which are not shown. FIG. 4 has a current limit amplifier U1, having its non-inverting input coupled to a current limit reference (not shown) and its inverting input coupled to a node between an FET transistor Q1 and a sense resistor Rsense. The other terminal of transistor Q1 is connected to the return voltage RTN and the other terminal of the sense resistor is connected to $V_{SS}$. Current from the PD's load flows through RTN to $V_{SS}$, generating a voltage drop across Rsense which is used to measure the load current. If the voltage across the resistor exceeds the predetermined reference, Current Limit Reference, the transistor Q1 is used to limit the load current.

The node between transistor Q1 and resistor Rsense is also coupled to the non-inverting input of comparator U2. The inverting input of comparator U2 is coupled to an Auto MPS Reference (not shown). If the voltage across the resistor Rsense drops below the Auto MPS Reference, comparator U2 provides a signal to the timing logic 406, which, in turn, provides an enable signal to amplifier U3. Amplifier U3 has its non-inverting input coupled to a MPS Current Reference (not shown) and its inverting input coupled to a node between a transistor Q3 and resistor Rext. The other terminal of transistor Q3 is connected to $V_{DD}$ and the other terminal of the resistor Rext is connected to $V_{SS}$. An oscillator OSC1 402 generates a signal which is converted to pulses by MPS pulse generator 404 to control the timing logic 406 to produce the MPS signature pulses required to have the PSE maintain power to the PD. These pulses control amplifier U3 to generate a voltage at the node between the transistor and the external resistor Rext. The value of the external resistor determines the amount of current that is drawn, from $V_{DD}$ through the resistor Rext to $V_{SS}$, in order to provide the MPS signal to the PSE. The resistor Rext may be external to the integrated circuit, such as 306, and thus, can be utilized by the end-user to determine the amount of current that is needed to maintain power to the PD for that particular application.

FIG. 5 shows another embodiment of the circuit shown in FIG. 3 as 306, generally as 500, although the circuit 306 may have other functions which are not shown. In FIG. 5, a transistor Q1 is coupled between the return line RTN and a resistor R1, the other terminal of which is connected to $V_{SS}$. A switch S1 connects the gate of transistor Q1 with an output of error amplifier U1. Error amplifier U1 has its non-inverting terminal coupled to a current limit reference (not shown) and its inverting input coupled to the node between transistor Q1 and resistor R1. The error amplifier U1 measures the voltage across resistor R1 to determine if the current exceeds the maximum current limit and to regulate the current to that maximum limit. A transistor Q2 is coupled between the signal line RTN and a resistor R2, the other terminal which is coupled to the node between transistor Q1 and resistor R1. That node is also connected to the non-inverting input of comparator U2, the inverting input of which is connected to an Auto MPS reference (not shown). A switch S2 is coupled between the output of the error amplifier U1 and the gate or transistor Q2. A switch S4 is coupled between the gate of transistor Q2 and $V_{SS}$. A transistor Q3 is connected between the voltage $V_{DD}$ and a node between transistor Q2 and resistor R2. The gate of transistor Q3 is connected to an output of error amplifier U3, which has its non-inverting input connected to the MPS Reference (not shown) and its inverting input coupled to the node between transistor Q2 and resistor R2.

An output of comparator U2 is coupled to the timing logic 506, which has outputs for each of the switches S1 through S4 and an enable output coupled to the enable input of error amplifier U3. An oscillator OSC1 502 generates a signal which is converted to pulses by MPS pulse generator 504, which are applied to timing logic 506. The timing logic utilizes the clock to generate the control signals for switches S1-S4 and for the pulses generated by error amplifier U3 and transistor Q3.

In normal operation switches S1 and S4 are closed and switches S3 and S2 are open, while in low power operation switches S2 and S3 are closed and switches S1 and S4 are open so that the current limiting action of error amplifier U1 is active as current limiting must always be provided. In normal operation, switch S4 is normally closed to maintain transistor Q2 off and switch S1 is closed to allow U1 to control the current through Q1. Switches S2 and S3 are open at this time. All the current from the load returns to the RTN node and passes through transistor Q1 and resistor R1. The voltage across resistor R1 is used to measure the current through the load and is applied to the inverting input of error amplifier U1. The Current Limit Reference is applied to the non-inverting input of error amplifier U1. This current measurement is utilized to limit the current, should the current exceed a predetermined threshold. The voltage across resistor R1 is also compared against the Auto MPS Reference applied to the inverting input of comparator U2, the output of which is utilized to control the timing logic control switches S1-S4. If the current through resistor R1 falls below a predetermined threshold, switches S1 and S4 are opened and switches S2 and S3 are closed by signals generated by the timing logic 506. This turns off transistor Q1 and turns on transistor Q2. Thus, the current returning from the PD load, through the RTN node, passes through transistor Q2, through resistor R2 and then through resistor R1 to Vss.

In order to minimize power dissipation, the value of resistor R1 value is kept as low as possible. However, at low currents this produces a large error when U2 is used to compare the load current to a threshold (Auto MPS Reference) due to any offset voltage of comparator U2. For example, with a value of 25 mΩ for R1, 1 mV offset in the comparator U2 can create a measurement error of 40 mA. Given the fact that the normal current needed to maintain power from the PSE to the PD is quite low (only 10-15 mA), this can be a significant error. In the circuit of FIG. 5, once the current is determined to be too low to maintain power from the PSE to the PD, a second resistor R2 is switched into the circuit. This resistor may be 5Ω, for example. This resistor, along with resistor R1 in series, is used by U3 to generate any needed MPS current. This much larger resistance allows U3 to much more accurately control the MPS current, generating only an additional current needed. For example, a 1 mV offset in the amplifier U3, the error would only be 200 μA. Thus, this circuit permits the utilization of a low resistance shunt during normal operation to minimize the power loss in the shunt resistor, and then adds a higher resistance for generating a more accurate current pulse needed to maintain the power flow from the PSE to the PD, thus saving power.

If MPS pulses are needed, the timing logic 506 enables the enable input of error amplifier U3 to generate a voltage via transistor Q3 at the top of the resistor chain comprising R2 and R1, which determines the amount of additional current that needs to be passed through the circuit in order that the pulses, supplied to $V_{DD}$, meet or exceed the requirements for the MPS signature so that the PSE will continue to provide power to the PD. As the load current is also flowing through R1 and R2 and thus it is included in the current generated by U3, only the additional current needed to meet the MPS requirement is produced.

FIG. 6 shows one type of load for the DC/DC converter, such as DC/DC converter 308 in FIG. 3, generally as 600. As shown in FIG. 6, the load comprises a plurality of LEDs, such as 602a, 602b - - - 602n which would be connected from the Vout terminal of the converter to ground, for example. The number of LEDs in the string is a design choice. The LEDs may provide for general room lighting, for example, and not just indicate that power is applied to a device, such as the PD itself. Other circuits, which provide additional functionality, such as determining the occupancy of an area by way of a motion detector, for example, can also be connected as part of the load.

Although the invention has been described in detail, it should be understood that various changes, substitutions and alterations can be made thereto without departing from the spirit and scope of the invention as defined by the appended claims.

The invention claimed is:

1. An interface circuit for a Powered Device (PD) that is couplable to a Power Sourcing Equipment (PSE) in a Power over Ethernet (PoE) system, the interface circuit comprising:
    a comparator coupled to a first resistor through which current flows from the PSE when connected to a load within the PD, the comparator configured to measure a voltage drop across the first resistor to determine the load current and generate an output signal representative of the load current;
    a timing logic responsive to the output signal for generating switch control signals and an enable signal;
    a switch responsive to one of the switch control signals for inserting a second resistor in a current path of the first resistor for generating an accurate current pulse in order to meet Maintaining Power Signature (MPS) requirements; and
    an error amplifier coupled to the current path and responsive to the enable signal for automatically generating a load pulse of sufficient magnitude that, along with current drawn by the PD to power a load, indicates to the PSE that power to the PD is being maintained.

2. The interface circuit of claim 1 further comprising a first transistor coupled in series with the first resistor and having a gate coupled to a current limiting circuit for limiting current to the load;
    a second transistor coupled in series with the second resistor; and
    wherein the switch disables the first transistor and couples a gate of the second transistor to the current limiting circuit.

3. The interface circuit of claim 1, wherein the interface circuit provides power to a general LED lighting.

4. The interface circuit of claim 1, wherein the load pulses have a predetermined duration and spacing.

5. The interface circuit of claim 1, wherein the first resistor is a low valued shunt and the second resistor has a resistance of at least an order of a magnitude higher than the first resistor.

6. An interface circuit for a Powered Device (PD) for a Power over Ethernet (PoE) system, the interface circuit comprising:
    a comparator for measuring a load current in the PD and comparing the load current to a reference and generating an output signal;
    a timing logic circuit responsive to the output signal for generating an enable signal;
    an error amplifier responsive to the enable signal for generating an output voltage based on a reference; and
    a resistor coupled to an output of the error amplifier for drawing a current pulse when the PD is coupled to a Power Sourcing Equipment (PSE) to automatically indicate to the PSE, that the PSE is to maintain power delivery to the PD.

7. The interface circuit of claim 6, wherein the magnitude of the load pulses are controlled by an external resistor.

8. The interface circuit of claim 6, wherein the interface circuit provides power to a general LED lighting.

* * * * *